United States Patent [19]

Becker et al.

[11] Patent Number: 4,666,639
[45] Date of Patent: May 19, 1987

[54] PROCESS FOR THE PRODUCTION OF SPHERICAL FUEL ELEMENTS

[75] Inventors: Hans-Joachim Becker, Freigericht; Werner Heit, Linsengericht; Wilhelm Rind, Freigericht; Wolfgang Warzawa, Hanau, all of Fed. Rep. of Germany

[73] Assignee: Hobeg mbH, Hanau, Fed. Rep. of Germany

[21] Appl. No.: 772,394

[22] Filed: Sep. 4, 1985

[30] Foreign Application Priority Data

Sep. 29, 1984 [DE] Fed. Rep. of Germany ....... 3435861

[51] Int. Cl.$^4$ .................. G21C 21/02; G21C 21/00
[52] U.S. Cl. ......................... 264/0.5; 252/637; 252/639; 264/57; 264/63; 264/65; 264/66; 376/327; 376/411; 427/6
[58] Field of Search ............. 264/0.5, 60, 57, 63–66; 427/5, 6; 252/636, 637, 639, 632; 376/419, 327, 411

[56] References Cited

U.S. PATENT DOCUMENTS

| | | | |
|---|---|---|---|
| 3,978,177 | 8/1976 | Huschka et al. | 264/0.5 |
| 4,045,526 | 8/1977 | Iwamoto et al. | 264/0.5 |
| 4,140,738 | 2/1979 | Hrouat et al. | 264/0.5 |

FOREIGN PATENT DOCUMENTS

| | | | |
|---|---|---|---|
| 1158641 | 12/1963 | Fed. Rep. of Germany | 264/0.5 |
| 1812726 | 9/1969 | Fed. Rep. of Germany | 264/0.5 |
| 1909871 | 9/1970 | Fed. Rep. of Germany | 264/0.5 |
| 2601767 | 7/1976 | Fed. Rep. of Germany | 264/0.5 |
| 1301880 | 1/1973 | United Kingdom | 264/0.5 |

*Primary Examiner*—John F. Terapane
*Assistant Examiner*—Howard J. Locker
*Attorney, Agent, or Firm*—Cushman, Darby & Cushman

[57] ABSTRACT

To produce spherical fuel or absorber elements for high temperature reactors a mixture of coated nuclear fuel or absorber particles and graphite molding composition is molded into spheres, carbonized in a furnace having gas flushing and calcined in a vacuum. There are attained high throughputs without addition of transportation aides by employing as resin binders a thermosetting synthetic resin, hardening the resin at 110° to 170° C. and subsequently allowing the spheres to roll for 1 to 10 hours through an oven which is inclined around 2° to 12° to the horizontal. Thereby the oven must exhibit an increasing and decreasing temperature profile, the flushing gas introduced from both sides and be removed in a temperature zone of 400° to 500° C.

11 Claims, 1 Drawing Figure

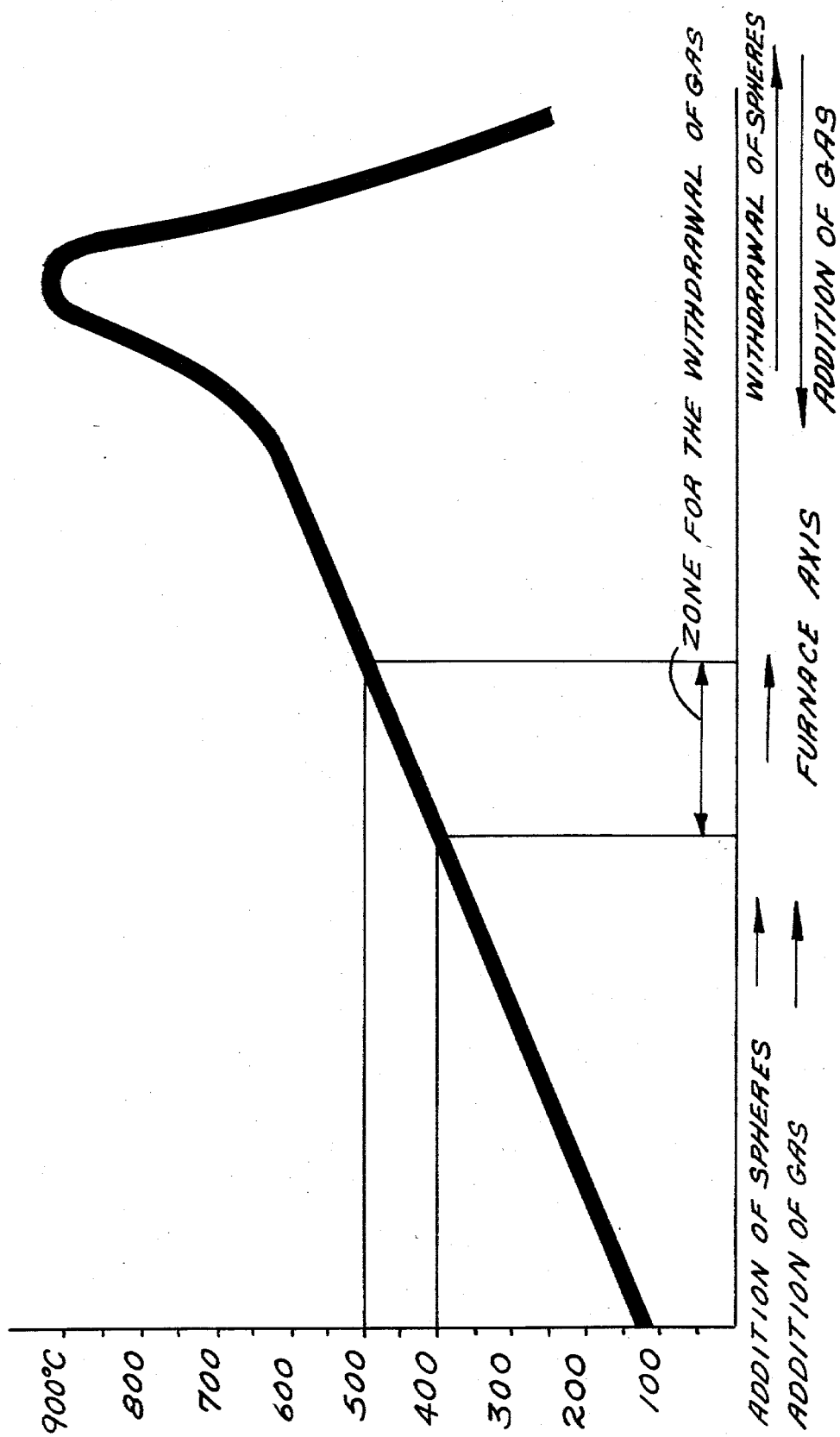

PROCESS FOR THE PRODUCTION OF SPHERICAL FUEL ELEMENTS

BACKGROUND OF THE INVENTION

The invention is directed to a process for the production of spherical fuel or absorber elements from high temperature reactors consisting of a graphitic matrix and embedded therein coated particles by molding a mixture of graphite molding powder containing resin binder with coated nuclear fuel or absorber particles to form a sphere (or balls), carbonizing the binder resin in a furnace with flushing gas and calcining in a vacuum at up to about 2000° C.

Spherical fuel or absorber elements for high temperature reactors, such as are described for example in German patent No. 1909871, contain the nuclear fuel or absorber material in the form of coated particles which are embedded in a graphitic matrix. In the production of this matrix material finely ground highly crystalline types of natural and/or electrographite are treated with a resin binder and further processed by mixing or kneading processes as well as further grinding to the required granulation to form a so-called graphite molding powder. Subsequently the coated particles, in a given case after an additional encasing step, in which they are coated with a molding powder layer of the order of magnitude of 100 μm, are coated with graphite molding powder and molded to spherical fuel elements. The resin binder is then carbonized in a carbonizing step, subsequently a purification and degassing of the elements is carried out whereby these elements are calcined at temperatures above 1600° C. in a vacuum.

As resin binder for the matrix material there can be used pitches as well as thermoplastic and thermosetting synthetic resins, especially there can be employed thermoplastic and thermosetting synthetic resins based on phenol, e.g. phenolformaldehyde and phenol-furfural.

In carbonizing this resin binder there are formed organic products of cracking. Furthermore there takes place a temporary softening of the binder, especially when using thermoplastic synthetic resins or pitches, during the temperature increase at the beginning of the carbonization process. During this phase the form stability of the fuel or absorber element molding is reduced.

These problems which customarily occur in the carbonization of resin binders and liberate even more highly condensed, difficultly volatile cracked products and temporary reduced form stability of the molding have lead to the carrying out of the carbonization of the spherical nearly exclusively batchwise in pot furnaces. Thereby the spheres are positioned on charging sheets in such manner that they do not contact each other in order to safely prevent a possible adhesion with products of carcking.

Thereby either the storage of the moldings must be carried out in such manner that no impermissible shaping occurs during the softening phase of the binder, or there must be employed thermosetting resin binders to maintain the form stability. Alternatively the moldings can also be carbonized in a push through furnace. Hereby the spheres must be transported through the furnace individually in suitable boats in order to prevent any possible mutual contact and adherence or an impermissible deformation. In all cases the products of cracking are removed from the carbonizing furnace by so-called flushing gas.

Because of the considerable expense in the loading and unloading of the charging position or the boats both processes are cumbersome and only permit a limited throughput per furnace unit.

Therefore it was the problem of the present invention to develop a process for the production of spherical fuel or absorber elements for high temperature reactors consisting of (or consisting essentially of) a graphitic matrix and particles embedded therein by molding a mixture of graphite molding powder containing a binder resin with coated nuclear fuel or absorber particles to form a sphere, carbonizing the resin binder in a furnace with gas flushing and vacuum calcining up to about 2000° C., whereby a continuous method of operation with high throughputs can be produced, without adherence of the spheres or without taking into consideration a temporary form of instability and without employing transportation aids.

SUMMARY OF THE INVENTION

This problem was solved according to the invention by employing as the resin binder a thermosetting synthetic resin and after the molding of the spheres this resin binder is next completely hardened at temperatures between 100° and 170° C. over a period of time of not less than 4 hours and that the spheres subsequently are run through the downwardly inclined furnace for 1 to 10 hours for carbonizing, the slope being around 2° to 12° from the horizontal, whereby the furnace exhibits a temperature profile from the side of addition of spheres to the side of withdrawal of spheres increasing from around 100° to 800° to 1000° C. and then steeply falling from 800° to 1000° C. to around 100° C., and whereby the flushing gas is supplied both from the side of addition of the spheres and from the side of the withdrawal of the spheres from the furnace and is drawn off in the furnace region where there is a temperature of 400° to 500° C. in the increasing temperature profile.

Preferably there is used as the resin binder a synthetic resin based on phenol and hexamethylenetetramine. Besides the furnace temperature should not exceed a maximum value of 800° to 1000° C., whereby this temperature must be maintained over 10 to 20% of the length of the furnace. It has also been found advantageous if the inclination of the furnace is 3° to 10° to the horizontal.

For reasons of form stability of the spheres there are only employed thermosetting resin binders, preferably based on phenol/hexamethylenetetramine, and a specific process step precedes the carbonization in which this resin binder after molding the fuel or absorber elements first is completely hardened at temperatures between 110° and 170° C. over a time of at least 4 hours. These hardened elements can be rolled through the flow channel of the carbonization furnace which is inclined to the horizontal by the influence of gravity alone without any further aid, whereby an adherence or blocking is prevented. A specific temperature profile is established in the furnace, preferably through several heating zones and the flushing gas is supplied both form the side of the furnace where the spheres are added and also from the side of the furnace where the spheres are withdrawn and the flushing gas is withdrawn in the region of furnace in which a temperature between 400° and 500° C. prevails.

Surprisingly by using spheres in which the thermosetting resins binder of the matrix material is completely hardened and through the special supply of the flushing gases in the carbonization furnace the result is that even the difficulty volatile cracking products are removed so safely that an adherence of spheres (balls) to each other or a depositing of cracked products residues in the flow channel, which would hinder the free rolling through, is prevented. Through the combined use of a hardened thermosetting resin binder with the described supply of flushing gas it is possible to permit continuous rolling of the balls as an uninterrupted column through the furnace, whereby the spheres can touch without problem and thus produce high throughputs. The use of transportation aids thereby is not necessary.

BRIEF DESCRIPTION OF THE DRAWING

The single FIGURE of the drawing is a graph showing the temperature profile in relation to the addition and withdrawal of gas and spheres.

The process can comprise, consist essentially of, or consist of the stated steps with the recited materials.

Unless otherwise indicated all parts and perecentages are by weight.

The following example explains the process of the invention.

DETAILED DESCRIPTION

A thousand spheres (balls) were produced using a graphite molding powder which consisted of 78% finely ground natural graphite/electrographite powder mixture as well as 22% resin binder (phenol and hexamethylenetetramine in a ratio of 5:1–10:1. After molding the molded products were exposed to a temperature of 150° C. for about 4 hours. As a result there was a complete hardening of the binder.

These spheres in a series were put through a continuous furnace having six filament circuits and following the temperature profile shown in the drawing whereby the flushing gas flowed through the furnace in the manner sketched in the drawing and the total residence time for the individual spheres (balls) from the entrance to the exit likewise was about 4 hours. The axis of the continuous channel thereby was inclined about 5° to the horizontal in order to guarantee a trouble free rolling through the furnace. The speed of conveyance of the resulting piled up column of spheres in the continuous channel was controlled by the discharge: With increasing interval between the time of withdrawal of two successively withdrawn balls the effective conveyance speed decreased for the subsequent rolling column of balls. Argon with a throughput of 500 l/h was employed as flushing gas. Subsequently the balls were purified and degassed in customary manner in a vacuum at temperatures about 1600° C.

As a parallel to this balls were produced using the same graphite molding powder in conventional manner. In regard to the essential properties of the finished matrix material (density, strength, resistance to corrosion) there were no statistically significant differences between the conventional balls and those produced according to the process of the invention.

What is claimed is:

1. In a process for the production of spherical fuel or absorption elements for high temperature reactors consisting essentially of a graphitic matrix and coated particles embedded therein by molding a mixture of graphite molding powder containing resin binder with coated nuclear fuel or absorber particles to form a ball, carbonizing the resin binder in a furnace with gas flushing and vacuum calcining at a temperature up to about 2000° C., the improvement comprising employing a thermosetting synthetic resin as the resin binder, and after molding the ball completely hardening this resin binder at a temperature between 100° and 170° C. over a time of at least about 4 hours and subsequently running the balls through a furnace for a period of 1 to 10 hours for carbonization of the binder resin while the balls are inclined downwardly in the furnace at around 2° to 12° to the horizontal, whereby the furnace has a temperature profile from the side at which the balls enter to the side at which the balls are withdrawn increasing from around 100° C. to 800° to 1000° C. and decreasing sharply from 800° to 100° C., and whereby the flushing gas is supplied both from the ball addition side and the ball withdrawal side of the furnace and the flushing gas is withdrawn in the furnace region with a temperature of 400° to 500° C. in the temperature increasing portion of the profile.

2. A process according to claim 1 wherein the balls are inclined downwardly in the furnace at 3° to 10° to the horizontal.

3. A process according to claim 1 wherein the flushing gas is an inert gas.

4. A process according to claim 3 wherein the flushing gas is argon.

5. A process according to claim 1 wherein the resin binder is a thermosetting phenolformaldehyde resin.

6. A process according to claim 5 wherein the resin is made from phenol and hexamethylenetetramine.

7. A process according to claim 6 wherein the furnace temperature has a maximum of 800° to 1000° C. which is maintained over 10 to 20% of the length of the furnace.

8. A process according to claim 1 wherein the furnace temperature has a maximum of 800° to 1000° C. which is maintained over 10 to 20% of the length of the furnace.

9. A process according to claim 8 wherein the balls are inclined downwardly in the furnace at 3° to 10° to the horizontal.

10. A process according to claim 7 wherein the balls are inclined downwardly in the furnace at 3° to 10° to the horizontal.

11. A process according to claim 6 wherein the balls are inclined downwardly in the furnace at 3° to 10° to the horizontal.

* * * * *